US009363244B2

(12) United States Patent
Michiels et al.

(10) Patent No.: US 9,363,244 B2
(45) Date of Patent: Jun. 7, 2016

(54) REALIZING AUTHORIZATION VIA INCORRECT FUNCTIONAL BEHAVIOR OF A WHITE-BOX IMPLEMENTATION (71) Applicant: NXP B.V., Eindhoven (NL)

(72) Inventors: Wil Michiels, Reusel (NL); Jan Hoogerbrugge, Helmond (NL)

(73) Assignee: NXP B.V., Eindhoven (NL)

( * ) Notice: Subject to any disclaimer, the term of this patent is extended or adjusted under 35 U.S.C. 154(b) by 38 days.

(21) Appl. No.: 14/263,191

(22) Filed: Apr. 28, 2014

(65) Prior Publication Data

US 2015/0312223 A1  Oct. 29, 2015

(51) Int. Cl.
G06F 21/51 (2013.01)
H04L 29/06 (2006.01)
H04L 9/00 (2006.01)

(52) U.S. Cl.
CPC ............ H04L 63/0428 (2013.01); G06F 21/51 (2013.01); H04L 9/002 (2013.01)

(58) Field of Classification Search
None
See application file for complete search history.

(56) References Cited

U.S. PATENT DOCUMENTS

| | | | |
|---|---|---|---|
| 2007/0014394 A1 | 1/2007 | Harder | |
| 2008/0005806 A1* | 1/2008 | Alve | 726/30 |
| 2011/0040964 A1* | 2/2011 | Nussbaum et al. | 713/155 |
| 2012/0163582 A1* | 6/2012 | Lee et al. | 380/28 |
| 2014/0101458 A1* | 4/2014 | Farrugia et al. | 713/190 |
| 2015/0312039 A1 | 10/2015 | Michiels et al. | |
| 2015/0312224 A1 | 10/2015 | Michiels et al. | |

OTHER PUBLICATIONS

"Syncrosoft MCFACT—Secure Data Processing Technology,", Retrust Sixth Quarterly Meeting, Villach Austria, Mar. 11, 2008.
Chow, et al., "A White-Box DES Implementation for DRM Applications", Digital Rights Management: ACM CCS-9 Workshop, DRM 2002, Washington, D.C., USA, Nov. 18, 2002, 1-16.
Chow, "White-Box Cryptography and an AES Implementation", Cryptography: 9th Annual International Workshop, SAC 2002, St. John's , Newfoundland, Canada, Aug. 15, 2002.
Extended European Search Report for EP 15 16 5309 dated Sep. 28, 2015.
Delerablee, et al., White-Box Security Notions for Symmetric Encryption Schemes, International Association for Cryptologic Research, vol. 20130830:084255, Aug. 22, 2013, pp. 1-23.
Michiels, "Opportunities in white-box cryptography.", IEEE Security & Privacy, 8(1), 64-67, 2010.

* cited by examiner

Primary Examiner — David Pearson (57) ABSTRACT

A method of authorization in a cryptographic system that provides separate authorization for a plurality of different input message groups using a single cryptographic key, including: receiving, by the cryptographic system, a first input message from a first input message group; performing, by the cryptographic system, a keyed cryptographic operation mapping the first input message into a first output message, wherein the keyed cryptographic operation produces a correct output message when the cryptographic system is authorized for the first input message group, wherein the keyed cryptographic operation does not produce a correct output when the cryptographic system is not authorized for the first input message group, and wherein each of the plurality of input message groups has an associated set of input messages wherein the sets of input messages do not overlap.

27 Claims, 3 Drawing Sheets

FIG. 1

WHITE-BOX IMPLEMENTATION

FUNCTIONS $f_i, g_i$ FIXED

REALIZING AUTHORIZATION VIA INCORRECT FUNCTIONAL BEHAVIOR OF A WHITE-BOX IMPLEMENTATION

TECHNICAL FIELD

Various exemplary embodiments disclosed herein relate generally to realizing authorization via incorrect functional behavior of a white-box implementation.

BACKGROUND

The Internet provides users with convenient and ubiquitous access to digital content. Because the Internet is a powerful distribution channel, many user devices strive to directly access the Internet. The user devices may include a personal computer, laptop computer, set-top box, internet enabled media player, mobile telephone, smart phone, tablet, mobile hotspot, or any other device that is capable of accessing the Internet. The use of the Internet as a distribution medium for copyrighted content creates the compelling challenge to secure the interests of the content provider. Increasingly, user devices operate using a processor loaded with suitable software to render (playback) digital content, such as audio and/or video. Control of the playback software is one way to enforce the interests of the content owner including the terms and conditions under which the content may be used. Previously many user devices were closed systems. Today more and more platforms are partially open. Some users may be assumed to have complete control over and access to the hardware and software that provides access to the content and a large amount of time and resources to attack and bypass any content protection mechanisms. As a consequence, content providers must deliver content to legitimate users across a hostile network to a community where not all users or user devices can be trusted.

Secure software applications may be called upon to carry out various functions such as, for example, cryptographic functions used to protect and authenticate digital content. In order to counter attacks, these algorithms have to be obfuscated (hidden) in order to prevent reverse engineering and modification of the algorithm or prohibit obtaining the user-specific secure information. Accordingly, the functions of the secure software application may be carried out by various functions as defined by the instruction set of the processor implementing the secure software. For example, one way to obscure these functions is by the use of lookup tables.

The widespread use of digital rights management (DRM) and other secure software has given rise to the need for secure, tamper-resistant software that seeks to complicate tampering with the software. Various techniques for increasing the tamper resistance of software applications exist. Most of these techniques are based on hiding the embedded knowledge of the application by adding a veil of randomness and complexity in both the control and the data path of the software application. The idea behind this is that it becomes more difficult to extract information merely by code inspection. It is therefore more difficult to find the code that, for example, handles access and permission control of the secure application, and consequently to change it.

As used herein, white-box cryptography includes a secure software application that performs cryptographic functions in an environment where an attacker has complete control of the system running the white-box cryptography software. Thus, the attacker can modify inputs and outputs, track the operations of the software, sample and monitor memory used by the software at any time, and even modify the software. Accordingly, the secure functions need to be carried out in a manner that prevents the disclosure of secret information used in the secure functionality. White-box cryptography functions may be implemented in various ways. Such methods include: obscuring the software code; using complex mathematical functions that obscure the use of the secret information; using look-up tables; using finite state machines; or any other methods that carry out cryptographic functions but hide the secret information needed for those secure functions. A white-box implementation may also contain components that include anti-debugging and tamper-proofing properties.

There are several reasons for preferring a software implementation of a cryptographic algorithm to a hardware implementation. This may, for instance, be the case because a software solution is renewable if the keys leak out, because it is has lower cost, or because the application-developer has no influence on the hardware where the white-box system is implemented.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various exemplary embodiments relate to a non-transitory machine-readable storage medium encoded with instructions for execution by a cryptographic system that provides separate authorization for a plurality of different input message groups using a single cryptographic key, the non-transitory machine-readable storage medium including: instructions for receiving, by the cryptographic system, a first input message from a first input message group; instructions for performing, by the cryptographic system, a keyed cryptographic operation mapping the first input message into a first output message, wherein the keyed cryptographic operation produces a correct output message when the cryptographic system is authorized for the first input message group, wherein the keyed cryptographic operation does not produce a correct output when the cryptographic system is not authorized for the first input message group, and wherein each of the plurality of input message groups has an associated set of input messages wherein the sets of input messages do not overlap.

Various embodiments are described wherein the when cryptographic system is not authorized for the first input, the keyed cryptographic operation produces an incorrect output message.

Various embodiments are described wherein the when cryptographic system is not authorized for the first input, the keyed cryptographic operation terminates.

Various embodiments are described further including: instructions for receiving a second input message from a second input message group; and instructions for performing, by the cryptographic system, a keyed cryptographic operation mapping the second input message into a second output message, wherein the keyed cryptographic operation produces a correct output message when the cryptographic system is authorized for the second input message group, wherein the keyed cryptographic operation does not produce a correct output when the cryptographic system is not authorized for the second input message group.

Various embodiments are described wherein the when cryptographic system is not authorized for the second input, the keyed cryptographic operation produces an incorrect output message.

Various embodiments are described wherein the when cryptographic system is not authorized for the second input, the keyed cryptographic operation terminates.

Various embodiments are described wherein the cryptographic system includes a network of lookup tables.

Various embodiments are described wherein the cryptographic system includes a network of finite state machines.

Various embodiments are described wherein the cryptographic operation includes encryption system (AES) or data encryption standard (DES).

Various embodiments are described wherein the cryptographic system includes a network of lookup tables, the cryptographic operation is an advanced encryption system (AES) operation, one of the lookup tables is modified to produce an incorrect output for input messages associated with unauthorized input message groups.

Further, various exemplary embodiments relate to a method of creating a cryptographic implementation of a cryptographic operation mapping an input message to an output message, wherein the cryptographic implementation provides separate authorization for a plurality of different input message groups using a single cryptographic key, including: producing a cryptographic implementation of the keyed cryptographic operation; receiving information identifying the authorization settings to be applied by the cryptographic implementation, wherein each identified authorization setting has an associated input message group, wherein each input message group is associated with a set of input messages, and wherein the sets of input messages do not overlap; modifying the cryptographic implementation based upon the received information identifying the authorization settings so that: when a received input message is associated with one of the authorized input message groups, the cryptographic implementation outputs a correct output message associated with the received input message; and when a received input message is not associated with one of the authorized input message groups, the cryptographic implementation outputs an incorrect output message associated with the received input message or terminates the operation of the keyed cryptographic operation.

Various embodiments are described wherein modifying the cryptographic implementation further includes modifying a portion of the cryptographic implementation associated with only input messages associated with the non-authorized input message groups.

Various embodiments are described wherein the cryptographic implementation includes a network of lookup tables.

Various embodiments are described wherein the keyed cryptographic operation is one of advanced encryption system (AES) or data encryption standard (DES).

Various embodiments are described wherein the cryptographic system includes a network of lookup tables, the keyed cryptographic operation is an advanced encryption system (AES) operation, one of the lookup tables is modified to produce an incorrect output for input messages associated with unauthorized input message groups.

Various embodiments are described wherein the cryptographic system includes a network of lookup tables, the keyed cryptographic operation is an advanced encryption system (AES) operation, one of the lookup tables is modified to terminate the operation of the keyed cryptographic operation.

Various embodiments are described wherein the cryptographic system includes a network of finite state machines.

Further, various exemplary embodiments relate to a method of authorization in a cryptographic system that provides separate authorization for a plurality of different input message groups using a single cryptographic key, including: receiving, by the cryptographic system, a first input message from a first input message group; performing, by the cryptographic system, a keyed cryptographic operation mapping the first input message into a first output message, wherein the keyed cryptographic operation produces a correct output message when the cryptographic system is authorized for the first input message group, wherein the keyed cryptographic operation does not produce a correct output when the cryptographic system is not authorized for the first input message group, and wherein each of the plurality of input message groups has an associated set of input messages wherein the sets of input messages do not overlap.

Various embodiments are described wherein the when white-box system is not authorized for the first input, the keyed cryptographic operation produces an incorrect output message.

Various embodiments are described wherein the when white-box system is not authorized for the first input, the keyed cryptographic operation terminates.

Various embodiments are described further including: receiving a second input message from a second input message group; and performing, by the white-box system, a keyed cryptographic operation mapping the second input message into a second output message, wherein the keyed cryptographic operation produces a correct output message when the white-box system is authorized for the second input message group, wherein the keyed cryptographic operation does not produce a correct output when the white-box system is not authorized for the second input message group.

Various embodiments are described wherein the when white-box system is not authorized for the second input, the keyed cryptographic operation produces an incorrect output message.

Various embodiments are described wherein the when white-box system is not authorized for the second input, the keyed cryptographic operation terminates.

Various embodiments are described wherein the white-box system includes a network of lookup tables.

Various embodiments are described wherein the white-box system includes a network of finite state machines.

Various embodiments are described wherein the cryptographic operation is one of advanced encryption system (AES) or data encryption standard (DES).

Various embodiments are described wherein the white-box system includes a network of lookup tables, the cryptographic operation is an advanced encryption system (AES) operation, one of the lookup tables is modified to produce an incorrect output for input messages associated with unauthorized input message groups.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

The discussion below is directed to white-box cryptography because it is the most challenging attack model. Further, many cryptographic implementations are deployed and used in an environment where they are subject to a white-box attack. There is also a black-box attack model and a grey-box attack model. In the black-box attack model, it is assumed that the attacker only has access to the input and output of the implementation. In the grey-box attack model, it is assumed, that in addition the access to the input and the output of the implementation, that the attacker has access to side channel information regarding the execution of the implementation. Such side channel information may include power, timing, electronic emissions, etc. Accordingly, the benefits of the embodiments described below may be used to prevent any of these various levels of attack as well as others that may be defined. Therefore, where white-box implementations are described, it is intended that they may include black-box implementations as well as grey-box implementations that use the various methods described in the embodiments below.

Embodiments are described below that realize authorization via incorrect functional behavior of a white-box implementation. For example, let $M_1$ and $M_2$ be two sets of messages or message groups that are or need to be encrypted under the same key. Furthermore, let $M_1$ be a set of messages for which a user u is not authorized to encrypt/decrypt it and let $M_2$ be a set of messages for which user u is authorized to encrypt/decrypt it. Then, a cryptographic algorithm may be implemented by a white-box implementation such that it gives a correct answer for all messages from $M_2$. However, for any messages from $M_1$ it either computes an incorrect value or it terminates (e.g., because of a missing lookup table entry in a table-based white-box implementation). Preferably, an incorrect answer contains as little information as possible about the corresponding correct answer. This may be realized by introducing an error in one of the first rounds of the white-box implementation.

As an example, such embodiments as described below may be used for conditional access in a digital television system. Suppose that that the digital television system has 16 channels. Furthermore, suppose that a user may subscribe to each channel separately. One method to implement this system is to have 16 keys and by encrypting each channel with a different key. This adds complexity by requiring the use and management of 16 keys. Each key would require its own white-box implementation. Such complexities only increase as the number of channels in the system increases. The embodiments described below offer an alternative in which all channels are encrypted with the same key. The channel information may instead be encoded in the message as a 4-bit value which results in 16 non-overlapping sets $M_i$ of input messages, where each set of messages is associated with a specific channel in the digital television system. The encoding of the channel information may be explicit or implicit. The input messages may be encoded such that if a user has bought a license for channels from set V, then the user receives a white-box implementation that works correctly for messages associated with the channels in the set V and that does not work correctly otherwise. While a digital television system is provided as an example, the embodiments described herein may be applied in other situations and systems. Any place a single key is used to perform a cryptographic function on data in input streams where different authorizations are needed to access the different input streams, these embodiments may be applied.

Cryptographic keys play an important role in the security of many systems. They are, for instance, used for authentication, integrity checking, and ensuring the confidentiality of data. In such systems it is essential to hide the cryptographic keys. If an adversary is able to extract a key, this compromises the security.

White-box cryptography is the discipline of implementing a cryptographic algorithm in software such that it is difficult for an attacker to find the key. Hereby, we assume the strongest conceivable (but for software most realistic) attack model in which the adversary is assumed to have full control over and full access to the white-box implementation.

Accordingly, it is desirable keep the number of cryptographic keys in a networked system small. This is not only true because of memory requirements, but also to simplify the key handling and to prevent the need for multiple encryptions of the same data. Hence, the same key may be used for encoding each of the channels in the digital television system.

The embodiments described below show how white-box implementations may be used to realize authorization via incorrect functional behavior of the white-box implementation. The approach works by selecting messages from a set associated with the desired authorization settings.

A table-based approach to a white-box implementation of the Advanced Encryption Standard (AES) and the Data Encryption Standard (DES) were proposed in the following papers: "White-Box Cryptography and an AES Implementation", by Stanley Chow, Philip Eisen, Harold Johnson, and Paul C. Van Oorschot, in Selected Areas in Cryptography: 9th Annual International Workshop, SAC 2002, St. John's, Newfoundland, Canada, Aug. 15-16, 2002, referred to hereinafter as "Chow 1"; and "A White-Box DES Implementation for DRM Applications", by Stanley Chow, Phil Eisen, Harold Johnson, and Paul C. van Oorschot, in Digital Rights Management: ACM CCS-9 Workshop, DRM 2002, Washington, D.C., USA, Nov. 18, 2002, referred to hereinafter as "Chow 2". Chow 1 and Chow 2 disclose methods of using a table-based approach to hide the cryptographic key by a combination of encoding its tables with random bijections, and extending the cryptographic boundary by pushing it out further into the containing application.

As noted, for many cryptographic operations it is desired to have a white-box implementation. The invention may be applied, for example, to symmetric and asymmetric cryptographic operations. Also, the invention may be applied to block ciphers, stream ciphers, message authentication schemes, signature schemes, etc. Note that the invention may also be applied to hash functions. The latter is especially useful if the hash function is used as a building block which processes secret information, e.g., a secret key, secret data, etc. For example, the invention may be applied to a hash function used in a keyed-Hash Message Authentication Code (HMAC or KHMAC). Well known block ciphers include: Advanced Encryption Standard (AES), Secure And Fast Encryption Routine, (SAFER, and variants SAFER+ and SAFER++), Blowfish, Data Encryption Standard (DES), etc. A well known stream cipher is RC4. Moreover any block cipher can be used as stream cipher using an appropriate mode of operation, e.g., Cipher feedback (CFB), Counter mode (CTR), etc.

The white-box implementation may be implemented using a plurality of basic blocks. The plurality of basic blocks is interconnected, in the sense that some of the blocks build on the outputs of one or more of the previous blocks. A basic block may also be implemented in software running on a general purpose computer chip, e.g. a microprocessor. For example, a basic block may use a plurality of computer instructions, including arithmetical instructions, which together implement the functionality of the basic block. A widely used implementation for the basic block is a look-up table. For example, Chow 1 and Chow 2 take this approach to implement the AES and DES block ciphers. A look-up table implementation includes a list which lists for possible input values, an output value. The input value may be explicit in the lookup table. In that situation the look-up table implementation could map a particular input to a particular output by searching in the list of input values for the particular input. When the particular input is found the particular output is then also found. For example, the particular output may be stored alongside the particular input. Preferably, the input values are not stored explicitly, but only implicitly. For example, if the possible inputs are a consecutive range, e.g. of numbers or bit-strings, the look-up table may be restricted to storing a list of the output values. A particular input number may, e.g., be mapped to the particular output which is stored at a location indicated by the number. Further, finite state machines or code obfuscation may be used to implement the white-box implementation.

For example, a look up table for a function may be created by computing the output value of the function for its possible inputs and storing the outputs in a list. If the function depends on multiple inputs the outputs may be computed and stored for all possible combinations of the multiple inputs. Look-up tables are especially suited to implement non-linear functions, which map inputs to outputs in irregular ways. A whitebox implementation can be further obfuscated, as is explained below, by applying to one or more of its look-up tables a fixed obfuscating input encoding and a fixed output encodings. The results of applying a fixed obfuscating input encoding and output encodings is then fully pre-evaluated. Using this technique, a look-up table would be replaced by an obfuscated look-up table which has the same dimensions, that it takes the same number input bits and produces the same number of output bits. The input encoding and output encoding used in such obfuscation are not explicit in the final white-box implementation.

The network of basic blocks are arranged to compute an output message when they are presented with an input message. Typically, the input message is operated upon by a number of basic input blocks. A number of further basic blocks may take input from one or more of the basic input blocks and/or from the input. Yet further basic blocks can take input in any combination of the input message, the output of basic input blocks and the output of the further basic blocks. Finally some set of basic exit blocks, i.e., at least one, produce as output all or part of the output-message. In this manner a network of basic blocks emerges which collectively computes the mapping from the input message to output message.

The key used may be a cryptographic key and may contain sufficient entropy to withstand an anticipated brute force attack. It is noted that in a white-box implementation, the key is typically not explicitly present in the implementation. This would risk the key being found by inspection of the implementation. Typically, the key is only present implicitly. In other embodiments, the key may include dynamic keys that, for example, take implicit key information and combine it with some sort of dynamic information to produce the key used in the cryptographic function. Various ways are known to hide a key in a cryptographic system. Typically, at least the method of partial evaluation is used, wherein a basic block which needs key input is evaluated in-so-far that it does not depend on the input-message. For example, a basic operation wherein an input-value, a masking value, which does not depend on the input-message, e.g. a value from an S-box, and a key-value need to be XORed can be partially evaluated by XORing the key value and the masking value together beforehand. In this way the operation still depends on the key-value although the key-value is not explicitly present in the implementation. Instead, only the XOR between the key-value and masking-value is present in the implementation. Note that, more complicated ways and/or further ways of hiding the keys are compatible with this invention.

Below exemplary embodiments are described using the AES (Advanced Encryption Standard) block cipher, because AES has become a widely used standard for block ciphers. AES is a block cipher with a block size of 128 bits or 16 bytes. The plaintext is divided in blocks of 16 bytes which form the initial state of the encryption algorithm, and the final state of the encryption algorithm is the cipher text. At any given point in the encryption algorithm these 16 bytes are the state of the encryption algorithm. To conceptually explain AES, the bytes of the state are organized as a matrix of 4×4 bytes. AES includes a number of rounds, which depends on the key size. Each round is includes similar processing steps operating on bytes, rows, or columns of the state matrix, each round using a different round key in these processing steps. In the discussion using AES as an example, it is noted that AES defines a round in a specific manner. In the embodiments below, a round is any grouping of steps that includes at least one non-linear mapping function, such as an S-box in AES. Accordingly, a round as described below includes one non-linear mapping function and any combination of other steps of the cryptographic function. Further, the boundary of the round may start with the non-linear mapping function, for example an S-box, or any other operation that may be merged with the non-linear mapping function, for example a key addition.

Figure 1:
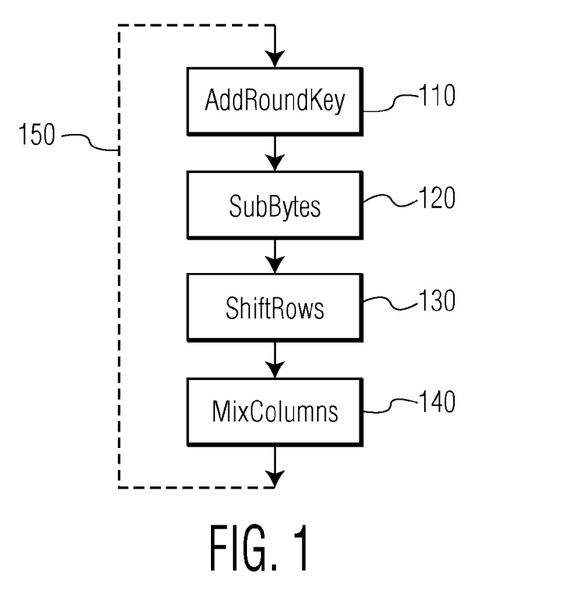
FIG. 1 illustrates the main steps of a round of AES.

FIG. 1 illustrates some main processing steps of a round of AES. The processing steps include:
AddRoundKey 110—each byte of the state is XORed with a byte of the round key;
SubBytes 120—a byte-to-byte permutation using a lookup table;
ShiftRows 140—each row of the state is rotated a fixed number of bytes; and
MixColumns 150—each column is processed using a modulo multiplication in $GF(2^8)$.

The steps SubBytes 120, ShiftRows 130, and MixColumns 150 are independent of the particular key used. The key is applied in the step AddRoundKey 110. Except for the step ShiftRows 140, the processing steps can be performed on each column of the 4×4 state matrix without knowledge of the other columns. Therefore, they can be regarded as 32-bit operations as each column consists of four 8-bit values. Dashed line 150 indicates that the process is repeated until the required number of rounds has been performed.

Each of these steps or a combination of steps may be represented by a lookup table or by a network of lookup tables. If the AddRoundKey 110 step is implemented by XORing with the round key, then the key is visible to the attacker in the white-box attack context. The AddRoundKey 110 step can also be embedded in lookup tables, which makes it less obvious to find out the key. In fact, it is possible to replace a full round of AES by a network of lookup tables. For example, the SubBytes 120, ShiftRows 130, and MixColumns 150 steps may be implemented using table lookups. Below a possible white-box implementation of AES in sufficient detail is discussed to describe the embodiments of the invention below, but further detailed descriptions of such an implementation are found in Chow 1. Also, other variations in the lookup table implementation may be used which are within the scope of the invention.

Figure 2:
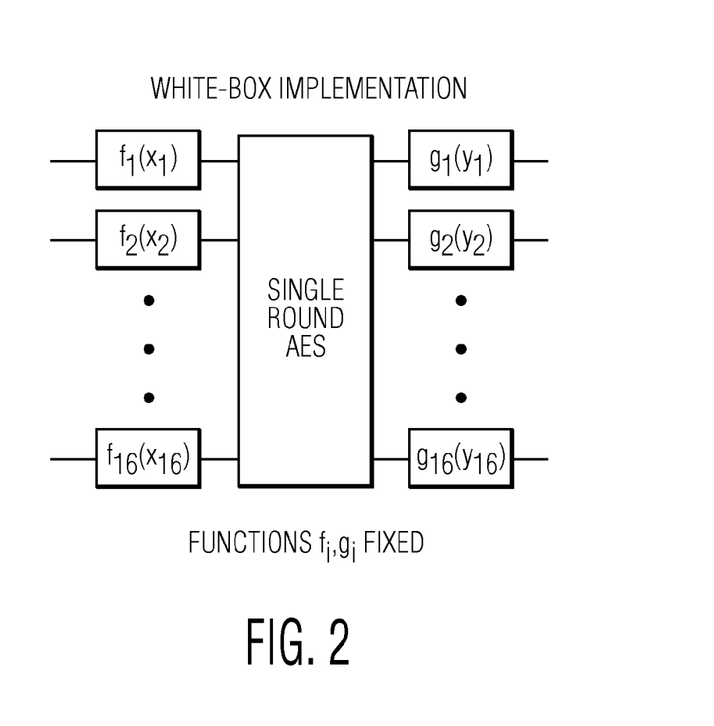
FIG. 2 illustrates a white-box AES implementation with encodings on the input of the rounds.

Both the table-based white-box implementations and the finite state machine implementations have the property that all intermediate values in the implementation are encoded (as compared to a standard implementation). Examples of white-box implementations using finite state machines are disclosed in U.S. Patent Publication 2007/0014394 entitled "Data Processing Method" and a presentation at the Re-trust Sixth Quarterly Meeting entitled "Synchrosoft MCFACT™ Secure Data Processing Technology" by Wulf Harder and Atis Straujums dated Mar. 11, 2008, which each are hereby incorporated by reference for all purposes as if fully set forth herein. FIG. 2 illustrates a white-box AES implementation with fixed encodings on the input of the rounds, i.e., on the input of the S-boxes. As shown, each of the 16 input bytes are encoded by $f_i$ and each of the output bytes are encoded by $g_i$.

In order to describe embodiments of the invention, a basic description of a table-based white-box AES implementation will be described. For a more detailed description of a method for implementing a table-based white-box AES see Chow 1. Chow 1 illustrates a specific implementation that breaks up certain functions using tables of specified sizes. It is well understood that various other divisions of the tables may be made resulting in different functions for the look-up tables and different sizes. Further, while the embodiments of the invention described below use a table-based white-box implementation of AES, other ciphers and cryptographic functions may be implemented according to the embodiments described. Also, other types of white-box implementations may be used instead of the table-base implementation, for example, a finite-state implementation.

The description of the table-based white-box AES is split into two steps. In the first step, a round of AES is described as a network of lookup tables. In the second step, the tables are obfuscated by encoding their input and output.

Step 1: Implementing AES as a Network of Lookup Tables.

AES operates on data blocks of 16 bytes. These are typically described as a 4×4 byte matrix, called the state including bytes $x_{1,1}, x_{1,2}, x_{1,3}, \ldots x_{4,4}$. A round of AES as described above with respect to FIG. 1 include the following operations: AddRoundKey 110, SubBytes 120, ShiftRows 130, and MixColumns 140. The first two operations, AddRoundKey and SubBytes can be merged into a single T-box operation. That is, we can define a byte-to-byte function $T_{i,j}$ for input byte $x_{i,j}$ as $T_{i,j}(x_{i,j})=S(x_{i,j}\oplus k_{i,j})$ where $k_{i,j}$ is a single byte of a 16 byte round key based upon the AES key. Let $y_{i,j}$ be the output of $T_{i,j}$. The ShiftRows operations is just an index-renumbering of the output bytes $y_{i,j}$. For ease of presentation, this operation is omitted in this description, but may be incorporated into the look-up table implementing $T_{i,j}$ or implemented as a separate manipulation of the state matrix. In the MixColumns step, an output byte $z_{i,j}$ of the round is computed from the 4 output bytes $y_{1,j}, y_{2,j}, y_{3,j},$ and $y_{4,j}$ via the algebraic expression $z_{l,j}=MC_{l,1}\cdot y_{1,j}\oplus MC_{l,2}\cdot y_{2,j}\oplus MC_{l,3}\cdot y_{3,j}\oplus MC_{l,4}\cdot y_{4,j}$ in $GF(2^8)$ for some constants $MC_{l,r}$.

Now define a lookup table for each byte-to-byte function $Q_{i,j,l}(x_{i,j})=MC_{l,i}\cdot T_{i,j}(x_{i,j})$ with $i,j,l=1, 2, \ldots, 16$. Then any output byte $z_{l,j}$ may be computed by XORing the results of these lookup tables, i.e., $z_{l,j}=Q_{1,j,l}(x_{1,j})\oplus Q_{2,j,l}(x_{2,j})\oplus Q_{3,j,l}(x_{3,j})\oplus Q_{4,j,l}(x_{4,j})$. Note that the index i,j,l of Q-box can be interpreted as "the contribution of input byte i, j of a round to output byte l, j of the round". The XOR may be implemented to operate on each of two nibbles (i.e., 4-bit values) as a lookup table to reduce the size of the XOR tables. Accordingly, the Q-box may be implemented to produce output nibbles so that the size of the tables is reduced. Therefore, the computation of each output byte $z_{l,j}$ of an AES-round has been described as a network of lookup tables. The network of lookup tables to compute a single output nibble of byte $z_{2,3}$ is shown in FIG. 3.

Figure 3:
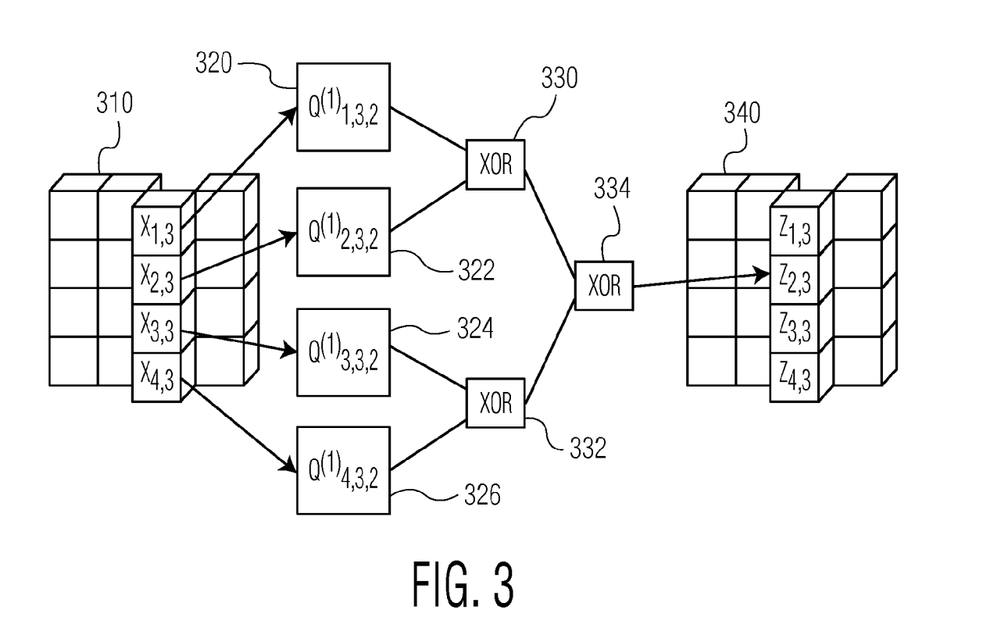
FIG. 3 illustrates the computation of one output nibble by means of a network of look-up tables.

FIG. 3 illustrates the computation of one output nibble by means of a network of look-up tables. The superscript index (1) in the Q-boxes indicates that the tables only provide the first nibble of the output of the Q-box. A set of input bytes $x_{1,3}, x_{2,3}, x_{3,3},$ and $x_{4,3}$ in the input state 310 are input into the Q-boxes 320, 322, 324, 326. The outputs of lookup tables 320 and 322 are fed into the XOR 330, and the outputs of lookup tables 324 and 326 are fed into the XOR 332. The outputs of XORs 330 and 332 are fed into XOR 334. The output of XOR 334 is the first nibble of the output $z_{2,3}$ of output state 340. The second nibble of the output $Z_{2,3}$ of output state 340 may be calculated in the same way using additional Q-boxes along with a similar XOR network. Further, additional sets of tables may be implemented to completely convert the input state 310 into the output state 340 by receiving a column of bytes from the input state and converting them into the output of the corresponding column of the output state.

Step 2: Obfuscating the Tables and the Intermediate Values

Figure 4:
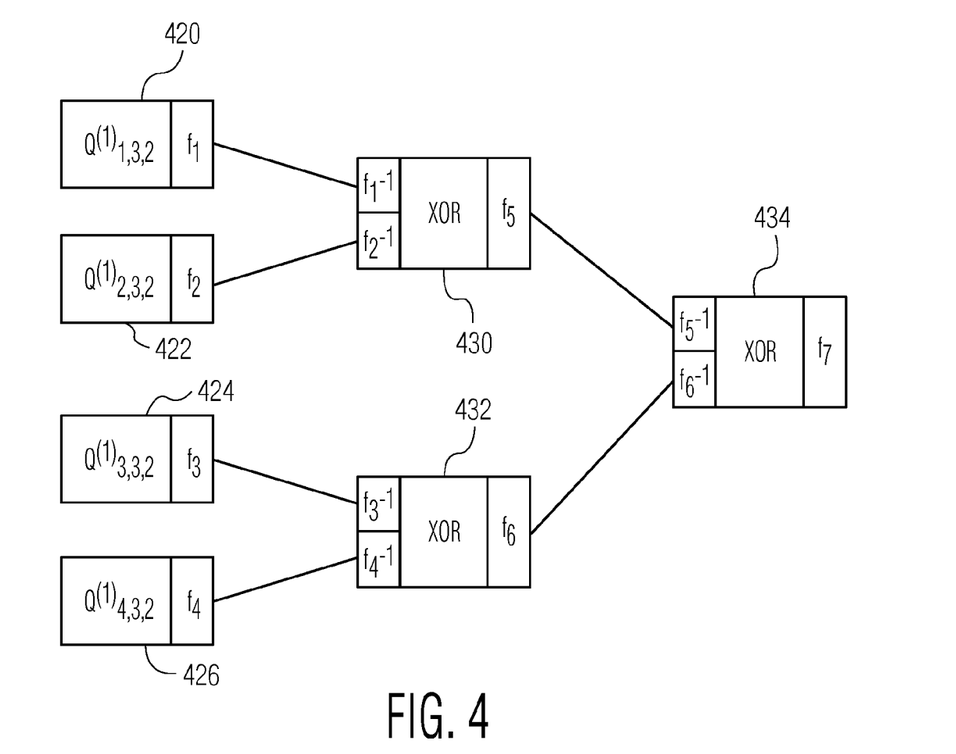
FIG. 4 illustrates a portion of the network table of FIG. 3 obfuscated by encoding the inputs and outputs.

In the implementation depicted in FIG. 3, the key may easily be extracted from the Q-boxes. Just applying the inverse MixColumns multiplication and the inverse S-box to the output reveals the plain AddRoundKey operation. To prevent this, the input and outputs of all lookup tables are encoded with arbitrary bijective functions. This is described in Chow 1. This means that a lookup table is merged with an encoding function that encodes the output and with a decoding function that decodes the input. The encodings are chosen such that the output encoding of one table matches the input encoding assumed in the next tables. A portion of the implementation of FIG. 3 is depicted in FIG. 4 for the first round. In this example, the input to the round is not encoded in order to be compliant with AES, but the output of the round is encoded. The output encoding is handled in the next round. That is, unlike the first round, the second round (and the later rounds) assumes that the input is encoded. Alternatively, the first round may receive an encoded input. This input encoding must then be applied elsewhere in the software program containing the white-box implementation. Similarly, the last round may or may not include an output encoding depending on whether the output is to be AES compliant. Note that in the white-box implementation obtained, both the lookup tables and the intermediate values are obfuscated.

The description of the table lookup based white-box implementation described above was for the encryption operation of AES. It is noted that the above description is easily adapted for the decryption operation by using the inverse of the Sub-Bytes, ShiftRows, and MixColumns operations (invSubytes, invShiftRows, and invMixColumns). Accordingly, it is assumed that the description above can be used for either the encryption or decryption operation of AES as needed in the embodiments below.

Now it will be shown how to implement the conditional access application for the digital television system discussed above. The digital television system has 16 channels that are all encrypted by the same key. A user u may subscribe to any subset $V_u \subseteq \{0, 1, \ldots, 15\}$ of these 16 channels. Furthermore, it is assumed in this embodiment that the content provider has some freedom in encrypting the content. That is, for each message m there is a set W(m) of messages that are more or less the same. If m has for instance a k-bit padding, then the set W(m) may contain m for all $2^k$ possible paddings. Alternatively, a user may apply an error correcting code to the outcome of the white-box implementation, in which case W(m) consists of all messages that are mapped to m by the error correcting code.

The content provider ensures that all messages in channel i are taken from $M_i$. The content provider can do so by running through all messages from W(m) until one from $M_i$ is found. In the case where an error correcting code is used, the plaintext messages may have some distance from each other. This means that if a limited number of perturbations are applied on the plaintext messages, the original message can still be reconstructed. The content provider now derives a message from $M_i$ by searching in W(m) via perturbing (e.g., flipping bits) in m. Then an authorized user can find the message m back by applying an error correcting code.

For example, consider that the digital television system uses AES to encrypt its channels. Further, consider in a white-box implementation of AES an obfuscated T-box of the third round, say the first one $T_{1,1}$. It can be verified that the input of this lookup table depends on all 16 input bytes to the complete AES implementation. Next define $M_i$ as the set of messages for which the first nibble of the non-obfuscated T-box operation $T_{1,1}$ equals the binary representation of i with i=0, 1, . . . , 15. The content provider now selects messages for channel i so that all selected messages are in $M_i$. The content provider may do so by running through all messages from W(m) until he finds one from $M_i$. The content provider will succeed with very high probability if W(m) is large enough.

Next, the white-box implementation is modified such that user u only gets the proper outcome for messages from $M_i$ if $i \in V_u$. This may be accomplished as follows. Let r be any row in the obfuscated lookup table of $T_{1,1}$ in round 3 of the white-box AES implementation. This row is indexed by an encoded 8-bit input $f(x_r)$, where $x_r$ is the input to the underlying T-box operation $T_{1,1}$. Define $x_r^{(1)}$ as the first nibble of $x_r$. Now the value of row r is changed into a random different value if and only if $x_r^{(1)} \notin V_u$. Then, the desired property that user u only decrypts messages correctly for channels on which they have a subscription is realized.

Consider a message m from a channel for which the user has no subscription. Then the white-box implementation changes a byte in the intermediate result in round 3. Hence, this change goes through 7 rounds of AES before the final outcome is produced. This results in an output message that will greatly deviate from m. Accordingly, changes in the early rounds lead to output messages that deviate greatly from the desired output messages which provides the desirable result that messages from unauthorized channels decode to messages very different from the correct message. Accordingly, when the cryptographic function is decryption, changes in the earlier rounds have the greatest effect on the output. When the cryptographic function is encryption, changes in the later rounds have the greatest effect on the output.

In an alternative embodiment, instead of producing an incorrect outcome, the white-box implementation may be modified to cease its execution when processing a message from a channel to which the user is not authorized. This may be done by, for example, by removing such rows in the obfuscated lookup table of $T_{1,1}$. The lack of an output value from the table lookup may be interpreted as an error that leads to halting the cryptographic processing of the input message. At that point a indication may be made that such a channel is not authorized.

A method according to the embodiments of the invention may be implemented on a computer as a computer implemented method. Executable code for a method according to the invention may be stored on a computer program medium. Examples of computer program media include memory devices, optical storage devices, integrated circuits, servers, online software, etc. Accordingly, a white-box system may include a computer implementing a white-box computer program. Such system, may also include other hardware elements including storage, network interface for transmission of data with external systems as well as among elements of the white-box system.

In an embodiment of the invention, the computer program may include computer program code adapted to perform all the steps of a method according to the invention when the computer program is run on a computer. Preferably, the computer program is embodied on a non-transitory computer readable medium.

In addition to the computer program being implemented on a non-transitory computer readable medium, such computer program may be transmitted to a user or user device for installation and use. This may be done over any communication network, for example, the internet.

Further, user devices implementing the embodiments described herein may include, smart cards, payment cards, transit cards, access cards and devices, mobile phones, tablets, personal digital assistants, portable and desktop computers, set-top boxes, digital video records, media streaming devices, etc. Uses of the embodiments described above may include payment software, security access, parking access, transit access and payments, banking, software and digital media transmission, secure communications, content distribution, etc.

Further, because white-box cryptography is often very complicated and/or obfuscated it is tedious for a human to write. It is therefore of advantage to have a method to create the cryptographic system according to the embodiments of the invention in an automated manner.

A method of creating the cryptographic system according to the invention may be implemented on a computer as a computer implemented method, or in dedicated hardware, or in a combination of both. Executable code for a method according to the invention may be stored on a computer program medium. In such a method, the computer program may include computer program code adapted to perform all the steps of the method when the computer program is run on a computer. The computer program may be embodied on a non-transitory computer readable medium.

Figure 5:
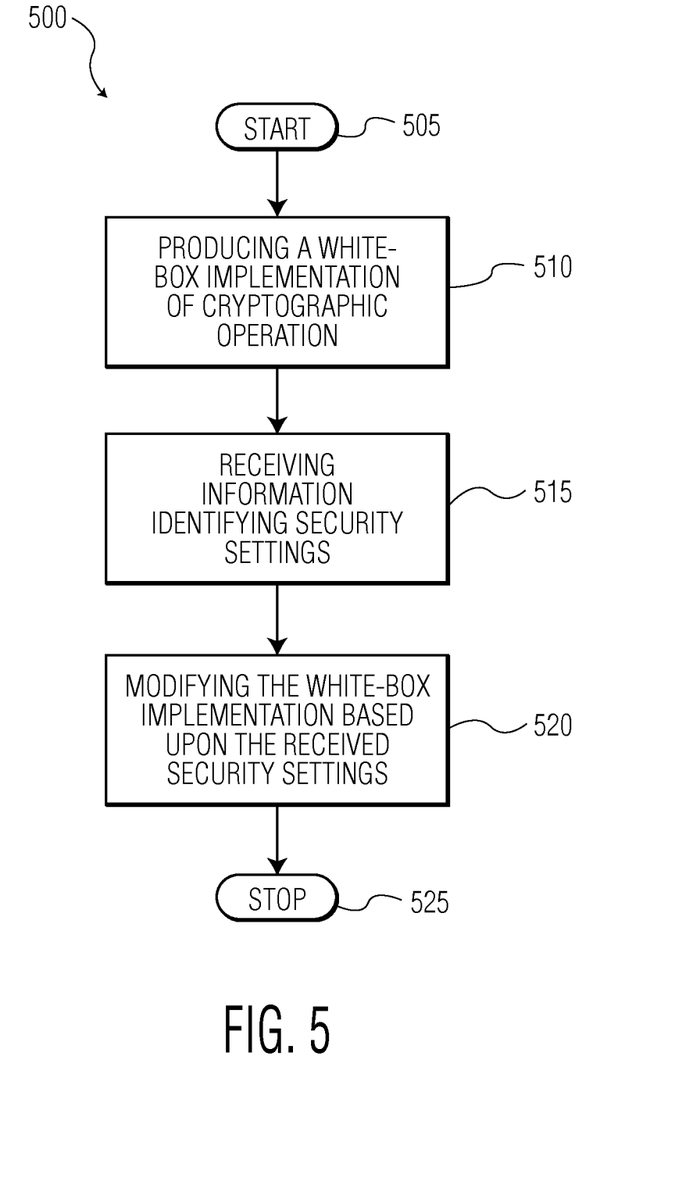
FIG. 5 is a flow chart illustrating a method of implementing a white-box implementation with use-dependent security settings.

FIG. 5 is a flow chart illustrating a method of implementing a white-box implementation that provides separate authorization for a plurality of different input streams using a single cryptographic key. First, the method begins 505. Then, a white-box implementation of the cryptographic operation is produced 510. This may be produced as described above using various methods and implementations. Next, information identifying the authorization settings to be applied by the white-box implementation may be received 515. Each identified authorization setting may have an associated input stream, wherein each input stream is associated with a set of input messages wherein the sets of input messages do not overlap. Then, the white-box implementation may be modified based upon the received information identifying the authorization settings 520 so that: when a received input message is associated with one of the authorized input streams, the white-box implementation outputs a correct output message associated with the received input message; and when a received input message is not associated with one of the authorized input streams, the white-box implementation outputs an incorrect output message associated with the received input message or terminates the operation of the keyed cryptographic operation. The method may then end 525.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory. Further, as used herein, the term "processor" will be understood to encompass a variety of devices such as microprocessors, field-programmable gate arrays (FPGAs), application-specific integrated circuits (ASICs), and other similar processing devices. When software is implemented on the processor, the combination becomes a single specific machine.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A non-transitory machine-readable storage medium encoded with instructions for execution by a cryptographic system that provides separate authorization for a plurality of different input message groups using a single cryptographic key, the non-transitory machine-readable storage medium comprising:
   instructions for receiving, by the cryptographic system, a first input message from a first input message group;
   instructions for performing, by the cryptographic system, a keyed cryptographic operation mapping the first input message into a first output message,
   wherein the keyed cryptographic operation produces a correct output message when the cryptographic system is authorized for the first input message group,
   wherein the keyed cryptographic operation does not produce a correct output when the cryptographic system is not authorized for the first input message group, and
   wherein each of the plurality of input message groups has an associated set of input messages wherein the sets of input messages do not overlap,
   wherein an input message space includes all potential input messages to the keyed cryptographic operation and the plurality of input message groups includes all of the input messages in the input message space.

2. The non-transitory machine-readable storage medium of claim 1, wherein the when cryptographic system is not authorized for the first input, the keyed cryptographic operation produces an incorrect output message.

3. The non-transitory machine-readable storage medium of claim 1, wherein the when cryptographic system is not authorized for the first input, the keyed cryptographic operation terminates.

4. The non-transitory machine-readable storage medium of claim 1, further comprising:
   instructions for receiving a second input message from a second input message group; and
   instructions for performing, by the cryptographic system, a keyed cryptographic operation mapping the second input message into a second output message,
   wherein the keyed cryptographic operation produces a correct output message when the cryptographic system is authorized for the second input message group,
   wherein the keyed cryptographic operation does not produce a correct output when the cryptographic system is not authorized for the second input message group.

5. The non-transitory machine-readable storage medium of claim 4, wherein the when cryptographic system is not authorized for the second input, the keyed cryptographic operation produces an incorrect output message.

6. The non-transitory machine-readable storage medium of claim 4, wherein the when cryptographic system is not authorized for the second input, the keyed cryptographic operation terminates.

7. The non-transitory machine-readable storage medium of claim 1, wherein the cryptographic syst2em includes a network of lookup tables.

8. The non-transitory machine-readable storage medium of claim 1, wherein the cryptographic system includes a network of finite state machines.

9. The non-transitory machine-readable storage medium of claim 1, wherein the cryptographic operation is one of encryption system (AES) or data encryption standard (DES).

10. The non-transitory machine-readable storage medium of claim 1, wherein
    the cryptographic system includes a network of lookup tables,
    the cryptographic operation is an advanced encryption system (AES) operation,
    one of the lookup tables is modified to produce an incorrect output for input messages associated with unauthorized input message groups.

11. A method of creating a cryptographic implementation of a cryptographic operation mapping an input message to an output message, wherein the cryptographic implementation provides separate authorization for a plurality of different input message groups using a single cryptographic key, comprising:
    producing a cryptographic implementation of the keyed cryptographic operation;
    receiving information identifying the authorization settings to be applied by the cryptographic implementation, wherein each identified authorization setting has an associated input message group, wherein each input message group is associated with a set of input messages, and wherein the sets of input messages do not overlap;

modifying the cryptographic implementation based upon the received information identifying the authorization settings so that:

when a received input message is associated with one of the authorized input message groups, the cryptographic implementation outputs a correct output message associated with the received input message; and when a received input message is not associated with one of the authorized input message groups, the cryptographic implementation outputs an incorrect output message associated with the received input message or terminates the operation of the keyed cryptographic operation, wherein an input message space includes all potential input messages to the keyed cryptographic operation and the plurality of input message groups includes all of the input messages in the input message space.

12. The method of claim 11, wherein modifying the cryptographic implementation further comprises modifying a portion of the cryptographic implementation associated with only input messages associated with the non-authorized input message groups.

13. The method of claim 11, wherein the cryptographic implementation includes a network of lookup tables.

14. The method of claim 11, wherein the keyed cryptographic operation is one of advanced encryption system (AES) or data encryption standard (DES).

15. The method of claim 11, wherein
the cryptographic system includes a network of lookup tables,
the keyed cryptographic operation is an advanced encryption system (AES) operation,
one of the lookup tables is modified to produce an incorrect output for input messages associated with unauthorized input message groups.

16. The method of claim 11, wherein
the cryptographic system includes a network of lookup tables,
the keyed cryptographic operation is an advanced encryption system (AES) operation,
one of the lookup tables is modified to terminate the operation of the keyed cryptographic operation.

17. The method of claim 11, wherein the cryptographic system includes a network of finite state machines.

18. A method of authorization in a cryptographic system that provides separate authorization for a plurality of different input message groups using a single cryptographic key, comprising:
receiving, by the cryptographic system, a first input message from a first input message group;
performing, by the cryptographic system, a keyed cryptographic operation mapping the first input message into a first output message,
wherein the keyed cryptographic operation produces a correct output message when the cryptographic system is authorized for the first input message group,
wherein the keyed cryptographic operation does not produce a correct output when the cryptographic system is not authorized for the first input message group, and
wherein each of the plurality of input message groups has an associated set of input messages wherein the sets of input messages do not overlap,
wherein an input message space includes all potential input messages to the keyed cryptographic operation and the plurality of input message groups includes all of the input messages in the input message space.

19. The method of claim 18, wherein the when white-box system is not authorized for the first input, the keyed cryptographic operation produces an incorrect output message.

20. The method of claim 18, wherein the when white-box system is not authorized for the first input, the keyed cryptographic operation terminates.

21. The method of claim 18, further comprising:
receiving a second input message from a second input message group; and
performing, by the white-box system, a keyed cryptographic operation mapping the second input message into a second output message,
wherein the keyed cryptographic operation produces a correct output message when the white-box system is authorized for the second input message group,
wherein the keyed cryptographic operation does not produce a correct output when the white-box system is not authorized for the second input message group.

22. The method of claim 21, wherein the when white-box system is not authorized for the second input, the keyed cryptographic operation produces an incorrect output message.

23. The method of claim 21, wherein the when white-box system is not authorized for the second input, the keyed cryptographic operation terminates.

24. The method of claim 18, wherein the white-box system includes a network of lookup tables.

25. The method of claim 18, wherein the white-box system includes a network of finite state machines.

26. The method of claim 18, wherein the cryptographic operation is one of advanced encryption system (AES) or data encryption standard (DES).

27. The method of claim 18, wherein
the white-box system includes a network of lookup tables,
the cryptographic operation is an advanced encryption system (AES) operation,
one of the lookup tables is modified to produce an incorrect output for input messages associated with unauthorized input message groups.

* * * * *